(12) United States Patent
Tovar

(10) Patent No.: US 10,011,091 B2
(45) Date of Patent: *Jul. 3, 2018

(54) LAMINAR COMPOSITE AND METHOD OF PRODUCING SAME

(71) Applicant: Mark Tovar, S. Virginia, MN (US)

(72) Inventor: Mark Tovar, S. Virginia, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/290,787

(22) Filed: Oct. 11, 2016

(65) Prior Publication Data

US 2017/0028681 A1 Feb. 2, 2017

Related U.S. Application Data

(63) Continuation of application No. 13/480,330, filed on May 24, 2012, now Pat. No. 9,486,983.

(60) Provisional application No. 61/535,344, filed on Sep. 15, 2011, provisional application No. 61/490,594, filed on May 27, 2011.

(51) Int. Cl.

| | |
|---|---|
| *B32B 9/02* | (2006.01) |
| *B32B 27/12* | (2006.01) |
| *B32B 27/30* | (2006.01) |
| *B32B 9/04* | (2006.01) |
| *B32B 37/00* | (2006.01) |
| *B32B 37/12* | (2006.01) |

(52) U.S. Cl.
CPC ............... *B32B 9/02* (2013.01); *B32B 9/043* (2013.01); *B32B 9/045* (2013.01); *B32B 27/12* (2013.01); *B32B 27/30* (2013.01); *B32B 37/003* (2013.01); *B32B 37/1207* (2013.01); *B32B 2250/03* (2013.01); *B32B 2250/40* (2013.01); *B32B 2307/412* (2013.01); *B32B 2307/414* (2013.01); *B32B 2309/02* (2013.01); *B32B 2309/105* (2013.01); *B32B 2317/08* (2013.01); *B32B 2405/00* (2013.01); *B32B 2451/00* (2013.01); *B32B 2457/00* (2013.01); *Y10T 156/10* (2015.01); *Y10T 428/266* (2015.01); *Y10T 428/269* (2015.01)

(58) Field of Classification Search
None
See application file for complete search history.

(56) References Cited

U.S. PATENT DOCUMENTS

| | | | | |
|---|---|---|---|---|
| 9,486,983 B2 * | 11/2016 | Tovar | ................. | B32B 9/02 |
| 2012/0251776 A1 * | 10/2012 | Godfrey | ................. | B32B 9/02 428/142 |

\* cited by examiner

*Primary Examiner* — Sheeba Ahmed
(74) *Attorney, Agent, or Firm* — Troutman Sanders LLP

(57) ABSTRACT

A laminar composite comprising a transparent or translucent cover layer, a base layer, and a layer of reptile shed sandwiched between the base layer and the cover layer. The base layer, cover layer and/or reptile shed are provided on one side with an adhesive, such as a heat-activatable adhesive, to bond the three layers together to form a flexible laminar composite.

19 Claims, 3 Drawing Sheets

LAMINAR COMPOSITE AND METHOD OF PRODUCING SAME

CROSS-REFERENCE TO RELATED APPLICATIONS AND PRIORITY CLAIM

This application is a continuation of U.S. Non-Provisional patent application Ser. No. 13/480,330 filed May 24, 2012 and entitled "Laminar Composite and Method of Producing Same," which claims priority to U.S. Provisional Patent Application No. 61/490,594 filed May 27, 2011 and entitled "Snake Skin Shed Snake Hook Grip" and U.S. Provisional Patent Application No. 61/535,344 filed Sep. 15, 2011 and entitled "Biomeld," all of which are fully incorporated by reference herein in their entireties.

BACKGROUND OF THE INVENTION

The present invention relates to a laminar composite, and to a method of producing such a laminar composite, for protecting a layer of reptile shed. Skin shed from a snake or other reptile is very fragile and brittle, and hence has a limited life.

It is therefore an object of the present invention to be able to preserve fragile or delicate reptile shed while providing a durable product.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The laminar composite of the present application comprises a transparent or translucent cover layer, preferably a vinyl material, a base layer, which can also be of vinyl or other polymeric material, and a layer of reptile shed sandwiched between the base layer and the cover layer, wherein all three layers are bonded together to form a flexible laminar composite, with the scale side of the reptile shed being visible through the cover layer.

The method of producing the laminar composite of the present application includes the steps of placing a cover layer onto a flat surface to provide an exposed side of the cover layer facing away from the flat surface; placing the scale side of a layer of reptile shed against the exposed side of the cover layer, with an adhesive type material being disposed between the reptile shed layer and the cover layer; and placing a base layer onto that side of the reptile shed layer that faces away from the cover layer such that the reptile shed layer is sandwiched between the cover layer and the base layer to form a layered composite, wherein an adhesive type material is disposed between the base layer and the reptile shed layer. The layered composite can be heated to bond the three layers together to form the laminar composite.

Further specific features of the present application will be described in detail subsequently.

DESCRIPTION OF SPECIFIC EMBODIMENTS

Figure 2:
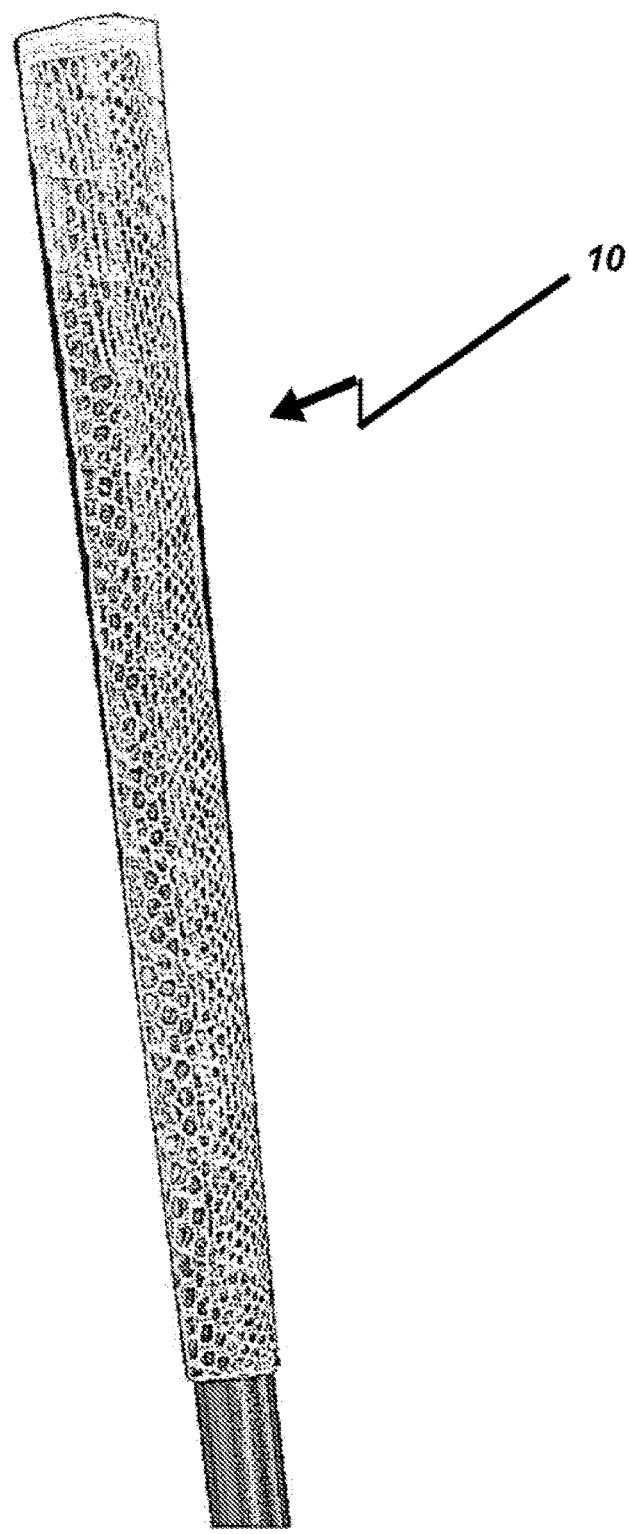
FIG. 2 shows an exemplary use of the laminar composite of the present application.
Figure 3:
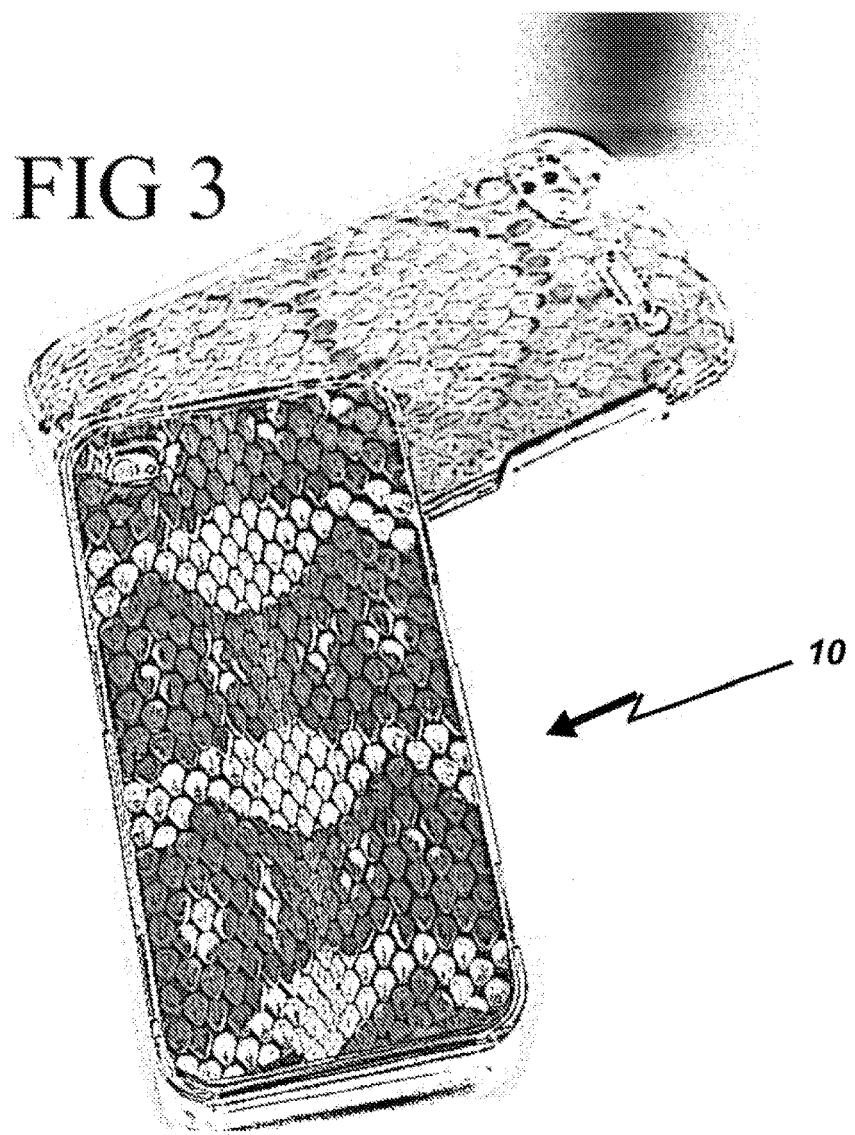
FIG. 3 shows another exemplary application of the laminar composite of the present application.

Referring now to the drawings in detail, the laminar composite of the present application is designated generally by the reference numeral 10. While FIG. 1 is a schematic cross-sectional view showing the basic construction of the laminar composite 10, FIGS. 2 and 3 show exemplary uses of the laminar composite product itself.

Figure 1:
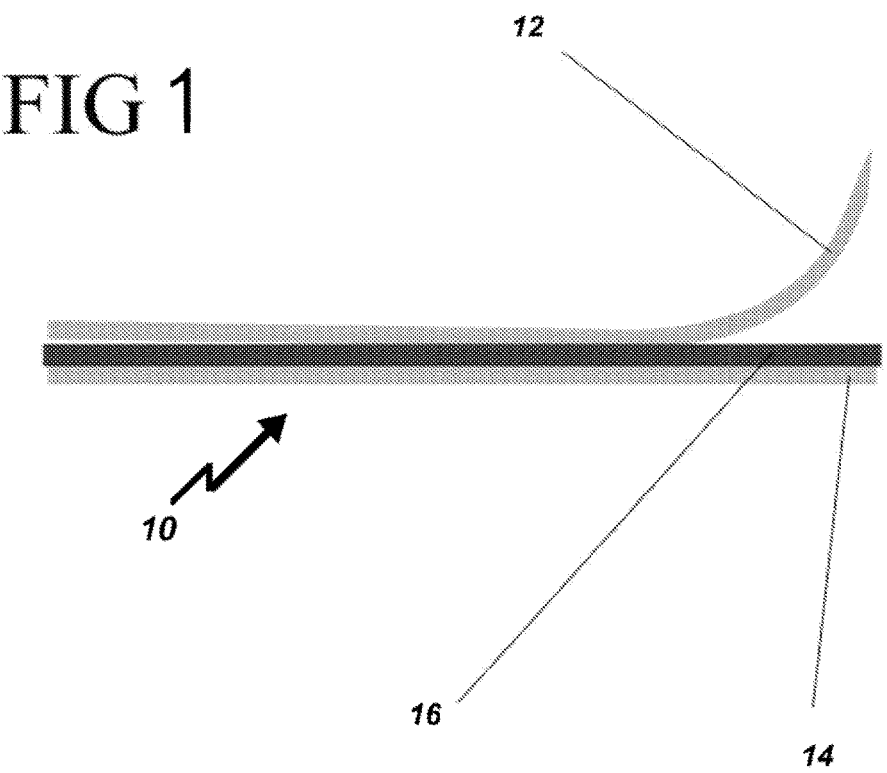
FIG. 1 is a cross-sectional view showing the basic build-up of the laminar composite of the present invention.

With regard to FIG. 1, shown are the three layers of the laminar composite 10. In particular, the reference numeral 12 indicates a transparent or translucent cover layer, the reference numeral 14 indicates a base layer, and the reference numeral 16 indicates a reptile shed, which is sandwiched between the cover layer 12 and the base layer 14.

The laminar composite 10 preserves the reptile shed 16 while providing a flexible and durable product that has numerous applications. By way of example only, the laminar composite 10 can be used as educational material, as well as a substitute for vinyl, leather and textile materials, for example as a covering for a cell phone or as a cell phone case, computer skins, covers for electronic products, purses, wallets, sunglasses, clothing, etc.

The transparent or translucent cover layer 12 is preferably comprised of a vinyl compound, including polymerized vinyl compounds. Examples of materials that can be used for the cover layer 12 include Therm O Web Vinyl—Gloss, Therm O Web Vinyl—Matte, Heat N Bond Vinyl—Gloss, Heat N Bond Vinyl—Matte, Pellon Vinyl—Gloss, Lenderink Dribond, Clear-Coat Overlay DriFilm, Clear Vinyl, and the like.

Similarly, the base layer 14 is also comprised of a flexible material, including vinyl compounds. By way of example, suitable materials for the base layer 14 include Spectra Eco-Film, Spectra Flex, ThermoFlex Plus, ThermoFlex Plus, ThermoFlex Xtra, ThermoFlex Sport, Cad-Cut Sportfilm lite, Cad-Cut Premium Plus, Cad-Cut Neon, Cad-Cut Fashion Film, Cad-Cut Fashion Film Electric and ThermoFlock.

Depending upon the use that is to be made of the final laminar composite product, the thickness of the cover layer 12 and base layer 14 can range from 0.010 mil up to 20 mil.

In order to bond the three layers 12, 14 and 16 together, an adhesive is first of all provided between the cover layer 12 and the reptile shed 16. Pursuant to one presently preferred embodiment, in this regard that side of the cover layer 12 that is to face the reptile shed 16 is provided with a heat-activated adhesive, which is to be activated in a manner to be described subsequently. The cover layer 12 can either be purchased with such a heat-activated adhesive already present on one side, or a heat activated adhesive could also be sprayed onto one side of the cover layer. Examples of heat-activated adhesives include Spray N Bond Fusible Adhesive and Heat N Bond Fusible Adhesive. An adhesive is also present between the base layer 14 and the reptile shed 16 to ensure bonding together of these layers upon subsequent heat treatment. In particular, that side of the base layer 14 that is to face the reptile shed 16 is either provided with a heat-activated adhesive when purchased, or such an adhesive can be sprayed onto one side of the base layer 14. Although heat-activated adhesives are convenient to use, it should be understood that the adhesive could be any other suitable strong yet flexible adhesive, especially between the base layer 14 and the reptile shed 16. A clear adhesive (i.e. one that will not yellow) must be used between the cover layer 12 and the reptile shed 16. The glue or adhesive can be applied in any suitable manner. Examples of further suitable adhesives include Pronty Clear Textile Adhesive, Plasti-dip (clear), Triple Thick, and the like.

The following describes one way of producing the laminar composite 10 of the present application.

EXAMPLE

In this example, the material that was to be used for the cover layer 12, here by way of example Pellon vinyl fuse, was purchased with an adhesive already provided on one side. Therefore, to start the process, the protective layer over the adhesive had first to be peeled off, exposing a tacky or sticky side of the material. The material was then placed onto a flat surface, with the sticky side facing up. The scale side of the reptile shed, here a gaboon viper shed, was then placed upon the sticky side of the cover layer 12, and was gently pressed against the cover layer. For the base layer, in this example a material with a heat-activatable sticky on one side was utilized, in particular Spectra Eco Film, a heat transfer vinyl, in this case a polyurethane based product. Again, the protective layer was first peeled off, and the sticky side of the material was then placed against, and pressed gently onto, the reptile shed 16 between the cover layer 12 and the base layer 14. To bond the three layers together, the layered materials were placed in a heat fusion machine and heated to a temperature that was specific for the materials being utilized; in this example, the layered materials were heated for 12 seconds at 305° F. The outer side of the base layer 14 was scraped to remove any air bubbles.

A laminar composite produced in this manner is then ready to be cut to any desired size for its intended use. For example, as shown in FIGS. 2 and 3, the laminar composite could be used to form a covering for a handle, or for a cell phone case. The laminar composite is also particularly suitable for making wallets, purses, and laptop skins. The laminar composite could be glued and/or sewn to an object, or a double-sided tape could be disposed between the laminar composite and the object to be covered thereby.

The specification incorporates by reference the disclosure of provisional application 61/490,594 filed May 27, 2011, as well as provisional application 61/535,344 filed Sep. 15, 2011.

The present invention is, of course, in no way restricted to the specific disclosure of the specification and drawings, but also encompasses any modifications within the scope of the appended claims.

The invention claimed is:

1. A laminar composite, comprising:
a transparent or translucent cover layer;
a reptile shed layer comprising a scale side and an inner side; and
a first layer of adhesive disposed between, and bonding, a base layer to the reptile shed layer;
wherein the transparent or translucent cover layer comprises a solidified liquid polymer bonded to the scale side of the reptile shed layer, and;
wherein the scale side of the reptile shed is visible through the cover layer.

2. The laminar composite of claim 1, wherein the base layer comprises a solidified liquid polymer.

3. The laminar composite of claim 1, wherein the base layer comprises a flexible polymeric film, wherein the base layer is bonded to the inner side of the reptile shed layer with layer of adhesive disposed between the base layer and the inner side of the reptile shed layer.

4. The laminar composite of claim 2, wherein the solidified liquid polymer bonded to the inner side of the reptile shed layer and the solidified liquid polymer bonded to the scale side of the reptile shed layer are the different.

5. The laminar composite of claim 1, wherein the solidified liquid polymer comprises one or more thermoplastic rubbers.

6. The laminar composite of claim 1, wherein the solidified liquid polymer further comprises at least one petrolatum.

7. The laminar composite of claim 5, wherein the thermoplastic rubbers comprise styrene/ethylene/butylene/styrene block copolymers and/or methylmethacrylate copolymer materials.

8. The laminar composite of claim 6, wherein the petrolatum comprises polybutene.

9. The laminar composite of claim 1, wherein the solidified liquid polymer is solidified by evaporation of a solvent.

10. The laminar composite of claim 1, wherein the solidified liquid polymer comprises a cured thermoset elastomeric compound.

11. A laminar composite, comprising:
a transparent or translucent cover layer;
a base layer;
a reptile shed layer comprising a scale side and an inner side; and
a first layer of adhesive disposed between, and bonding, the cover layer to the reptile shed layer;
wherein the base layer comprises a solidified liquid polymer bonded to the inner side of the reptile shed layer, and
wherein the transparent or translucent cover layer is bonded to the scale side of the reptile shed layer and the scale side of the reptile shed is visible through said cover layer.

12. The laminar composite of claim 11, wherein the base layer is transparent or translucent.

13. The laminar composite of claim 11, wherein the base layer is opaque.

14. The laminar composite of claim 13, wherein the base layer is at least partially visible from the scale side of the reptile shed layer.

15. The laminar composite of claim 11, wherein the transparent or translucent cover layer comprises a flexible polymeric film,
wherein the transparent or translucent cover layer is bonded to the scale side of the reptile shed layer with layer of adhesive disposed between the transparent or translucent cover layer and the scale side of the reptile shed layer.

16. The laminar composite of claim 11, wherein the solidified liquid polymer comprises one or more thermoplastic rubbers.

17. The laminar composite of claim 11, wherein the solidified liquid polymer further comprises at least one petrolatum.

18. The laminar composite of claim 11, wherein the solidified liquid polymer is solidified by evaporation of a solvent.

19. The laminar composite of claim 10, wherein the solidified liquid polymer comprises a cured thermoset elastomeric compound.

* * * * *